United States Patent
Furumiya

(10) Patent No.: US 10,746,885 B2
(45) Date of Patent: Aug. 18, 2020

(54) RADIATION DETECTOR

(71) Applicant: SHIMADZU CORPORATION, Kyoto-Shi, Kyoto (JP)

(72) Inventor: Tetsuo Furumiya, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 28 days.

(21) Appl. No.: 15/523,077

(22) PCT Filed: Oct. 30, 2014

(86) PCT No.: PCT/JP2014/078986
§ 371 (c)(1),
(2) Date: Apr. 28, 2017

(87) PCT Pub. No.: WO2016/067431
PCT Pub. Date: May 6, 2016

(65) Prior Publication Data
US 2017/0315243 A1    Nov. 2, 2017

(51) Int. Cl.
*G01T 1/20* (2006.01)
*G01T 1/24* (2006.01)

(52) U.S. Cl.
CPC .............. *G01T 1/2018* (2013.01); *G01T 1/20* (2013.01); *G01T 1/24* (2013.01); *G01T 1/247* (2013.01)

(58) Field of Classification Search
USPC ................................. 250/370.11, 367, 361 R
See application file for complete search history.

(56) References Cited

U.S. PATENT DOCUMENTS

| 6,654,058 B1* | 11/2003 | Hosier | H04N 5/3597 348/301 |
| 2010/0264322 A1* | 10/2010 | Levene | G01T 1/2018 250/367 |

(Continued)

FOREIGN PATENT DOCUMENTS

| EP | 2461182 | 6/2012 |
| JP | 2001-503526 | 3/2001 |

(Continued)

OTHER PUBLICATIONS

PCT/JP2014/078986, International Search Report and Written Opinion, dated Jan. 27, 2015, 7 pages—Japanese, pages—English.

(Continued)

*Primary Examiner* — David P Porta
*Assistant Examiner* — Carolyn Fin
(74) *Attorney, Agent, or Firm* — Andrew F. Young, Esq.; Lackenbach Siegel, LLP

(57) ABSTRACT

A radiation detector includes a plurality of semiconductor light receiving elements and a plurality of reflection elements that segment a scintillator array. A plurality of respective segment areas by the reflection elements. A plurality of amplifiers amplify signals obtained from respective semiconductor light receiving elements. The scintillator array includes a plurality of scintillators. The radiation detector provides a first accumulator per segment area, and a first trigger generation circuit per segment area. The first trigger generation circuit generates a first trigger of the multiple signal added by the first accumulator for each of the plurality of respective segment areas. An encoder generates a single first trigger signal based on the first trigger.

4 Claims, 10 Drawing Sheets

(56) References Cited

U.S. PATENT DOCUMENTS

2012/0091348 A1    4/2012  Wang et al.
2013/0334429 A1   12/2013  Fukuchi et al.
2016/0011321 A1*   1/2016  Solf ........................ G01T 1/171
                                                          250/363.03

FOREIGN PATENT DOCUMENTS

JP      2005-037363     2/2005
JP      2012-253024    12/2012

OTHER PUBLICATIONS

EP 14904923.6, European Search Report dated Oct. 18, 2017, 6 pages—English.

* cited by examiner

RADIATION DETECTOR

CROSS REFERENCE TO RELATED APPLICATIONS

This application relates to and claims priority as a national phase § 371 from Ser. No. PCT/JP2014/078986 filed Oct. 30, 2014, the entire contents of which are incorporated herein by reference.

FIGURE SELECTED FOR PUBLICATION

FIG. 2

BACKGROUND OF THE INVENTION

The present invention relates to a radiation detector that comprises at least two optically connected light receiving elements.

Conventionally, a photomultiplier tube has been applied to a radiation detector as a light receiving element having multiple channels (output terminals) (e.g., Patent Document 1), but recently a semiconductor light receiving element is being applied thereto as the light receiving element having one channel (output terminal) for a miniaturization purpose. In addition, according to Patent Document 1: JP2005-037363, reflection materials are in-place between adjacent scintillators to each other, forming a scintillator array to improve capability for incident location discrimination of a γ-ray and capability for detection thereof.

The inventor sets forth the structure of a conventional radiation detector referring to FIG. 9, FIG. 10. FIG. 9 is a side view illustrating a structure of the conventional radiation detector. FIG. 10 is a schematic view illustrating amplifiers and timing generation circuits relative to the conventional radiation detector. Referring to FIG. 9, the radiation detector 100 comprises scintillator arrays 110 consisting of a plurality of scintillators 111 (longitudinal 20×lateral 20=400 in FIG. 9) and a plurality of semiconductor light receiving elements 120, of which the number is smaller than the number of scintillators 111 (longitudinal 8×lateral 8=64 in FIG. 9). The semiconductor light receiving elements 120 optically connects at least two scintillators 111 (three scintillators in FIG. 9).

Referring to FIG. 10, the radiation detector 100 further comprises the amplifiers that amplify the signal obtained by the respective semiconductor light receiving elements 120 (referring to FIG. 9), wherein the number of the amplifiers that connect the timing generation circuit 140 is equal to the number of the one-on-one semiconductor light receiving elements 120 (64 in FIG. 10). The timing generation circuit 140 comprises an accumulator 141 that adds all signals amplified respectively by the amplifiers 130 and a trigger generation circuit 142 that generates a trigger of the signals added by the accumulator 141. A timing signal is generated based on the trigger generated by the trigger generation circuit 142. Specifically, referring to FIG. 10, the individual amplifier 130 is in-place per channel of the semiconductor light receiving element and the accumulator 141 adds all outputs (amplified signals) of the amplifier 130 and generates the timing signal.

RELATED PRIOR ART DOCUMENTS

Patent Document

Patent Document 1
JP 2005-037363 A1

ASPECTS AND SUMMARY OF THE INVENTION

Objects to be Solved

However, according to the conventional radiation detector referring to FIG. 9, FIG. 10, the number of channels of the amplifier increase along with increase of the plurality of the semiconductor light receiving elements and the inherent noise of each amplifier is superimposed when the accumulator adds signals, so that the signal-to-noise (S/N) ratio can be lowered and the timing signal accuracy can be impaired. In a high counting rate environment, the following radiation event initiates before the present radiation event (incident event) converges, so that the event probability of pileups (multiple pileups) can be higher.

Considering such circumstances, an object of the present invention is to provide a radiation detector that can ensure a high S/N ratio and can obtain an accurate timing signal.

Means for Solving the Problem

The present invention comprises the following structure to solve such problem.

Specifically, a radiation detector of the present invention comprises: a scintillator array comprising a plurality of scintillators; and a plurality of semiconductor light receiving elements, of which number is less than the number of the scintillators; wherein the semiconductor light receiving elements connects optically at least two of the scintillators; and further comprises: reflection materials that segment said scintillator array to respective areas; amplifiers that amplify signals obtained by said respective semiconductor light receiving elements, wherein the number of said amplifiers are equal to the number of one-on-one output terminals of said semiconductor light receiving elements; a first accumulator, which adds multiple signals amplified by the amplifiers in the area segmented by the reflection materials, per area segmented by the reflection materials; a first trigger generation circuit, which generate a trigger of the signals added by the first accumulator, per area segmented by the reflection materials; an encoder that converges the signals based on the trigger into one signal, which are generated respectively by the trigger generation circuit per area segmented by the reflection materials.

The radiation detector according to the present invention comprises a scintillator array comprising a plurality of scintillators and a plurality of semiconductor light receiving elements, of which the number is smaller than the number of scintillators. The semiconductor light receiving elements optically connects at least two scintillators, so that the semiconductor light receiving elements can have the optical data from at least two scintillators in common. The scintillator array is segmented per area by the reflection materials, so that the scintillator array can be optically divided into a plurality of areas (blocks). As well as the conventional aspects, the same number of amplifiers, which amplify signals obtained by the respective semiconductor light receiving elements, as the the number of the one-on-one output terminals of the semiconductor light receiving elements are equipped. In contrast, differently from the conventional aspect, the first accumulator that adds multiple signals amplified by the amplifiers in the area segmented by the reflection materials is equipped per area segmented by the reflection materials, and the first trigger generation circuit that generates a trigger of the signal added by the first accumulator is equipped per area segmented by the reflection materials. Consequently, when the signals are added, the superimposition of the inherent noises of each amplifier can be reduced as much as the area segmented by the reflection materials, so that the noise per se can be reduced by increasing the S/N ratio. In addition, even if the following event initiates before the current radiation event converges, the signals (timing signals) based on the respective signals in the different areas to each other are separately generated respectively and collected into one by the encoder, so that the even probability of pileups (multiple pileups) can be reduced and the accurate timing signal can be obtained. Consequently, the high S/N ratio is ensured and the accurate timing signal can be obtained.

The radiation detector of the present invention can further comprise a second accumulator that adds all respective signals amplified by the amplifier, a second trigger generation circuit that generate a trigger of the signals added by the second accumulator. For example, the signal may decay given radiation transmits the reflection materials due to Compton scattering in the scintillators. In addition, the signal may decay given the light emitted near the reflection materials partially transmits the reflection materials because the reflection materials may not reflect 100% the light emitted from the scintillator depending on the property of the material forming the reflection materials. However, even if the signal decays because radiation or light transmits the reflection materials, a trigger of the signal obtained by adding all signals is generated while comprising the second accumulator and the second trigger generation circuit set forth above, so that an accurate timing signal can be obtained.

When the second accumulator and the second trigger generation circuit set forth above are equipped, the first accumulator and the second accumulator can be connected in parallel to the amplifiers, or the first accumulator and the second accumulator can be connected in order in series with the amplifiers. In the latter case, when the first accumulator and the second accumulator can be connected in order in series with the amplifiers, the second accumulator can execute addition by utilizing the signal added by the first accumulator.

Effect of the Invention

A radiation detector according to the aspect of the present invention comprises a first accumulator that adds multiple signals amplified by the amplifiers per area segmented by the reflection materials, and a first trigger generation circuit that generates a trigger of the signal added by the first accumulator per area segmented by the reflection materials. Consequently, the high S/N ratio is ensured and the accurate timing signal can be obtained.

The above and other aspects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1A:
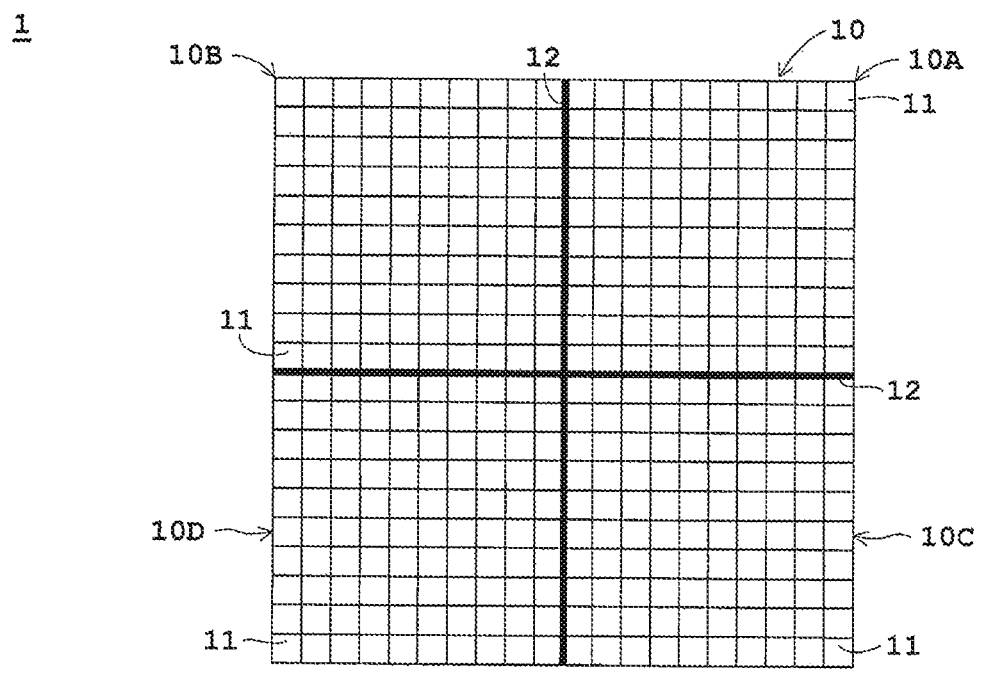
FIG. 1A is a plan view illustrating a structure of a radiation detector according to the aspect of the Embodiment 1, 2.

Reference will now be made in detail to embodiments of the invention. Wherever possible, same or similar reference numerals are used in the drawings and the description to refer to the same or like parts or steps. The drawings are in simplified form and are not to precise scale. The word 'couple' and similar terms do not necessarily denote direct and immediate connections, but also include connections through intermediate elements or devices. For purposes of convenience and clarity only, directional (up/down, etc.) or motional (forward/back, etc.) terms may be used with respect to the drawings. These and similar directional terms should not be construed to limit the scope in any manner. It will also be understood that other embodiments may be utilized without departing from the scope of the present invention, and that the detailed description is not to be taken in a limiting sense, and that elements may be differently positioned, or otherwise noted as in the appended claims without requirements of the written description being required thereto.

Various operations may be described as multiple discrete operations in turn, in a manner that may be helpful in understanding embodiments of the present invention; however, the order of description should not be construed to imply that these operations are order dependent.

Embodiment 1

Figure 1B:
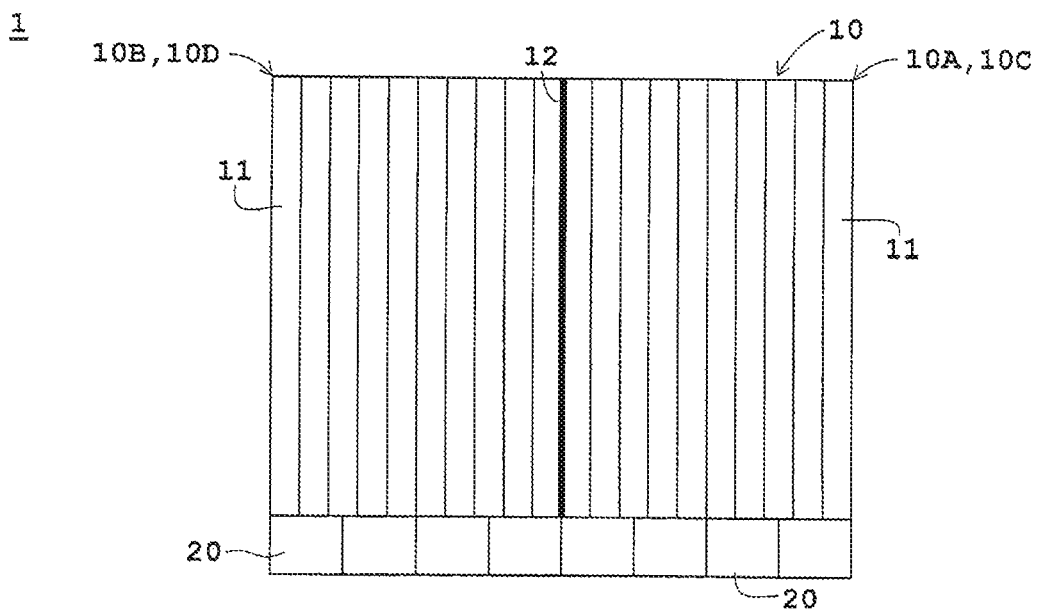
FIG. 1B is a side view of FIG. 1A.
Figure 2:
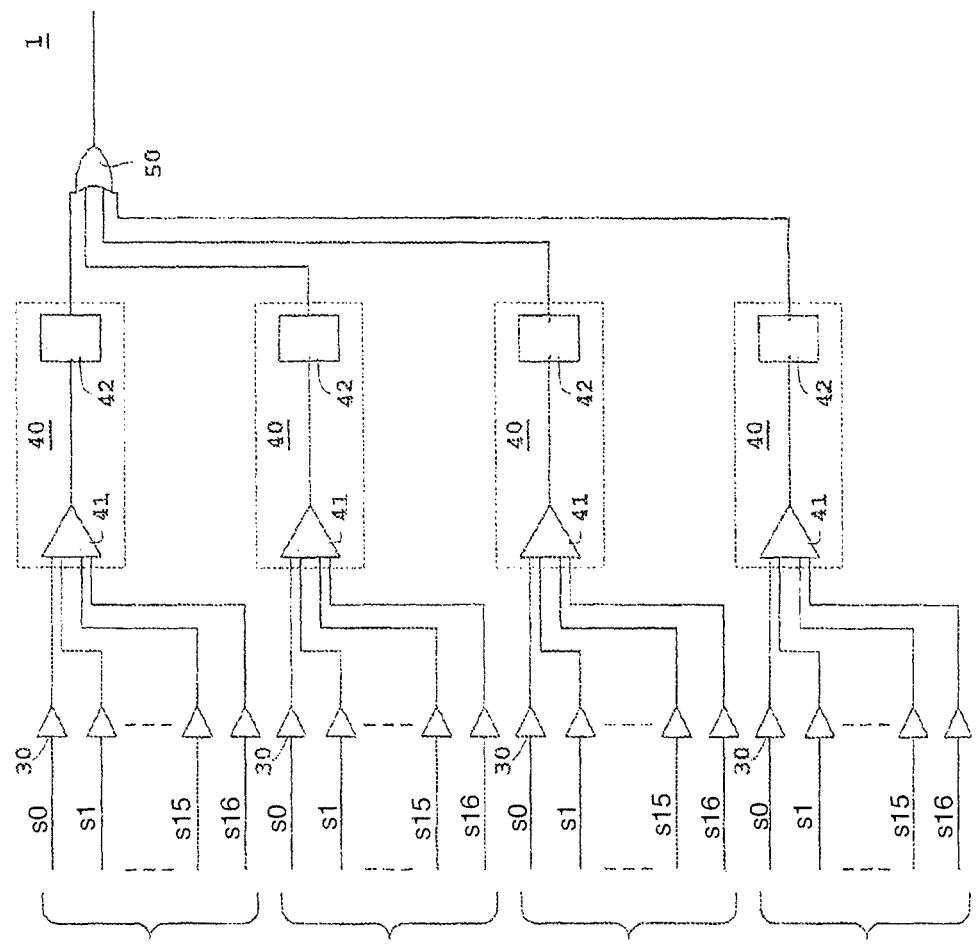
FIG. 2 is a schematic diagram illustrating the amplifiers and the timing generation circuits of the radiation detector according to the Embodiment 1.

Referring to Figures, the inventor sets forth the Embodiment 1 of the present invention. FIG. 1A is a plan view illustrating a structure of a radiation detector according to the aspect of the Embodiment 1, 2, FIG. 1B is a side view of FIG. 1A, and FIG. 2 is a schematic diagram illustrating the amplifiers and the timing generation circuits of the radiation detector according to the Embodiment 1.

Figure 9:
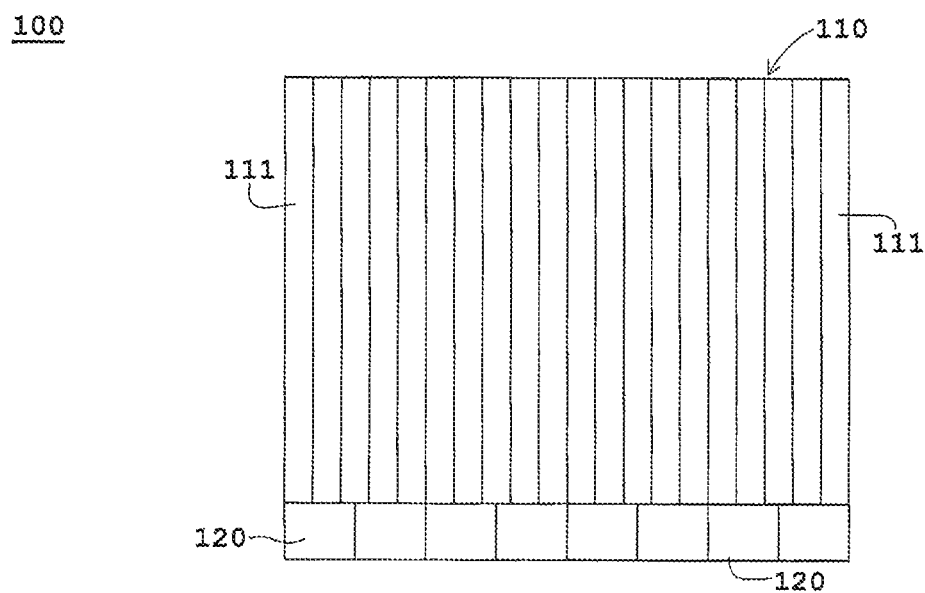
FIG. 9 is a schematic view illustrating an entire structure of a conventional radiation detector.

Referring to FIG. 1, the radiation detector 1 comprises scintillator arrays 10 consisting of a plurality of scintillator 11 (longitudinal 20×lateral 20=400 in FIG. 1 as well as in FIG. 9) and a plurality of semiconductor light receiving elements 20, of which the number is smaller than the number of scintillators 11 (longitudinal 8×lateral 8=64 in FIG. 1 as well as in FIG. 9). The semiconductor light receiving elements 20 optically connects at least two scintillators 11 (three scintillators in FIG. 1 as well as in FIG. 9). Referring to FIG. 1, when two semiconductor light receiving elements 20 are in-place every five scintillators 11 in longitudinal 20×lateral 20 scintillators 11, the number of semiconductor light receiving elements 20 is longitudinal 8×lateral 8.

The number of scintillators 11 is not limited to 400 (=longitudinal 20×lateral 20) in FIG. 1. In addition, the number of scintillators 11 in-place longitudinally and laterally is not mandatory to be the same to each other. The number of the semiconductor light receiving elements 20 is not limited to 64 (longitudinal 8×lateral 8) in FIG. 1. In addition, the number of semiconductor light receiving elements 20 in-place longitudinally and laterally is not mandatory to be the same to each other.

The semiconductor light receiving elements 20 is not limited particularly as long as the light receiving elements having one channel (output terminal), for example, an avalanche photo diode (APD). In addition, e.g., silicon photo multiplier (SiPM) can be applied as a Geiger mode avalanche photo diode (GAPD) that drives the avalanche photo diode (APD) in a Geiger mode. In addition, it is not mandatory that the semiconductor light receiving elements 20 has a single channel (output terminal) and semiconductor light receiving elements having an array structure having multiple channels (output terminals) in one chip can be applied.

Referring to FIG. 1 different from the conventional aspect in FIG. 9, the scintillator array 10 is segmented per area by the reflection materials 12. Referring to FIG. 1, the total two reflection materials 12 are intervened in the center of the scintillator array 10 longitudinally and laterally, so that the scintillator array 10 can be optically segmented to four area blocks. Referring to FIG. 1A, 1B, each area is specified as 10A, 10B, 10C, 10D. Referring to FIG. 1B, when two semiconductor light receiving elements 20 are in-place every five scintillators 11, the reflection materials 12 are placed in the location of ten scintillators 11, four semiconductor light receiving elements 20 so that the reflection materials 12 can intervene into the center of the scintillator array 10.

The number of the reflection materials 12 and the number of areas segmented by the reflection materials 12 are not limited to the numbers provided in FIG. 1 (two reflection materials and four areas). For example, referring to FIG. 1, when two semiconductor light receiving elements 20 are in-place every five scintillators 11 in longitudinal 20×lateral 20 scintillators 11, the scintillator array 10 can be optically divided into 16 areas (blocks) by the reflection materials 12 while intervening the reflection materials 12 every five scintillators 11 and two semiconductor light receiving elements 20. In addition, the number of the reflection materials 12 and the number of areas divided longitudinally and laterally by the reflection materials 12 are not mandatory to be the same to each other.

Figure 10:
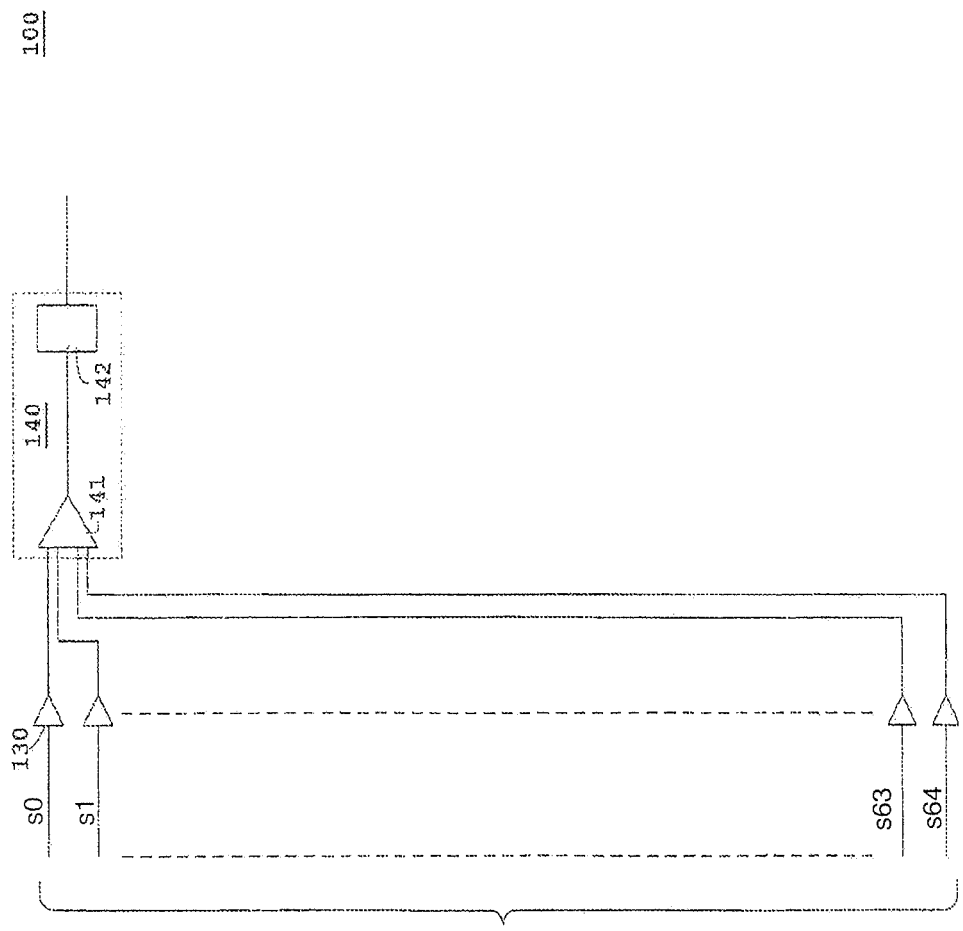
FIG. 10 is a schematic view illustrating amplifiers and timing generation circuits relative to the conventional radiation detector.

Referring to FIG. 2, the radiation detector 1 further comprises the amplifiers 30 that amplify the signal obtained by the respective semiconductor light receiving elements 20 (referring to FIG. 1), of which the number thereof is equal to the number of the one-on-one semiconductor light receiving elements 20 (64 in FIG. 10).

Differently from the conventional aspect referring to FIG. 10, referring to FIG. 2, a first timing generation circuit 40 is in-place per area 10A, 10B, 10C, 10D segmented by the reflection materials 12 (referring to FIG. 1) and a timing signal is generated based on the trigger generated by the first trigger generation circuit 42 per 10A, 10B, 10C, 10D. In addition, the first timing generation circuit 40 comprises the first accumulator 41 that adds multiple signals amplified respectively by the amplifiers 30 in the areas 10A, 10B, 10C, 10D segmented by the reflection materials 12 and the first trigger generation circuit 42 that generates a trigger of the signals added by the first accumulator 41. It should be noted that when identifying the signals in FIGS. 2, 7, 8, 11, the reference character "s" followed by a number was provided. For example, the reference character "s0" denotes the first signal in a grouping of signals per area, "s1" denotes a second signal. "s14" denotes a fifteenth signal. "s15" denotes a sixteenth signal, and so on. The ellipsis. i.e., " . . . " notes that signals therebetween. i.e., s2, s3, s4, and so on, even though not explicitly labeled in the figure for the sake of conciseness are nonetheless present. With respect to FIG. 10, discussed in more detail below, the reference characters "s62" and "s63" are similarly understood to identify a sixty-third and sixty-fourth signal, respectively.

In such way, the radiation detector 1 comprises the first accumulator 41; which adds multiple signals amplified respectively by the amplifiers 30 in the areas 10A, 10B, 10C, 10D segmented by the reflection materials 12; per area 10A, 10B, 10C, 10D segmented by the reflection materials 12. In addition, the radiation detector 1 comprises the first trigger generation circuit 42; which generates the trigger of the signals added by the first accumulator 41, per area 10A, 10B, 10C, 10D segmented by the reflection materials 12. Subsequently, the radiation detector 1 comprises an encoder 50 that converges the signals (timing signals) based on the trigger generated respectively by the first trigger generation circuit 42 per area 10A, 10B, 10C, 10D segmented by the reflection materials 12 into one signal.

Figure 5:
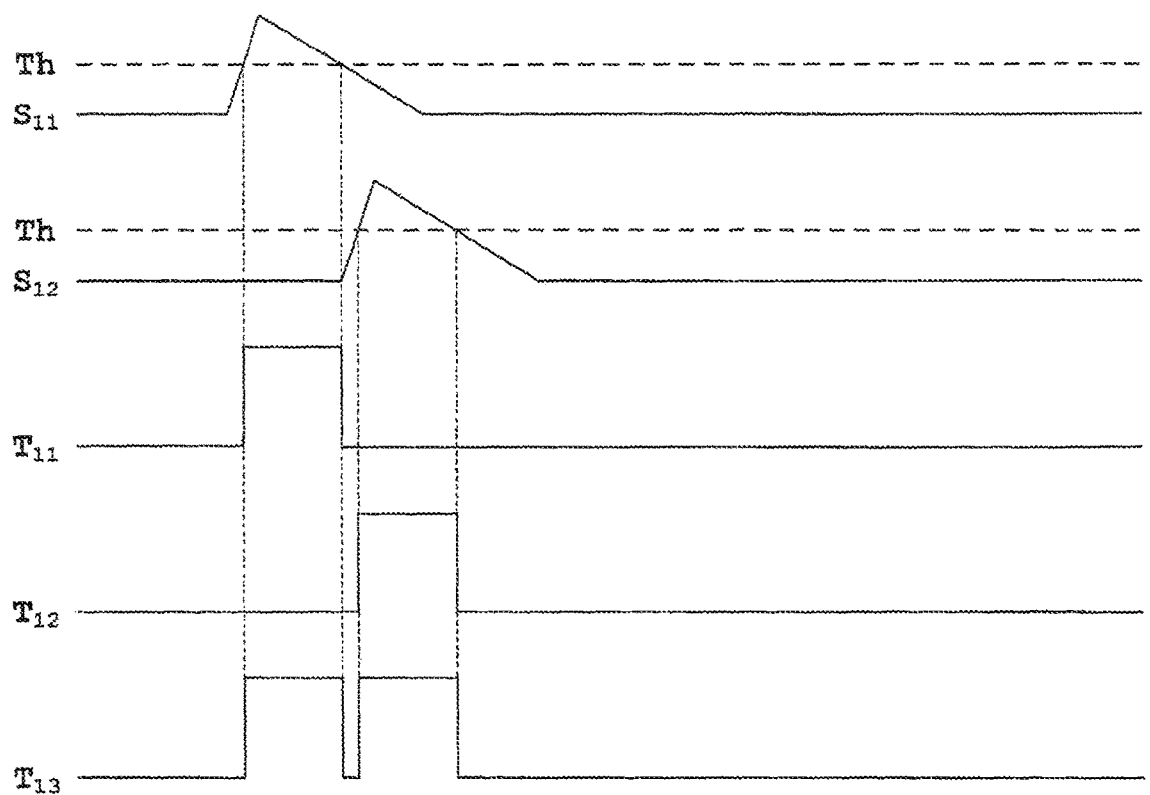
FIG. 5 is a schematic timing chart illustrating generation of the timing signal according to the Embodiment 1.

The first trigger generation circuit 42 is not particularly limited as long as the circuit element can generates the trigger of the signals, for example, a comparator or a constant fraction discriminator (CFD) are feasible. Referring to FIG. 5 set forth later, when the comparator is applied to the first trigger generation circuit 42, such comparator is effective on generation of the timing signal (timing generation signal) when higher than a timing generation threshold value Th. Nevertheless, given the accurate timing signal may not be obtained in case due to noise of a signal, variable rising of the signal (leading edge) or variable falling of the signal (trailing edge), the constant fraction discriminator (CFD) is preferable for the first trigger generation circuit 42.

The encoder 50 is not particularly limited as long as the circuit element converges the signals, e.g., OR logic can be applied. Referring to FIG. 5 set forth later, when either timing signal T11 of the first event or timing signal T12 of the next event is generated, the final timing signal T13 can be generated accurately by applying the OR logic to the encoder 50.

According to the conventional aspects (referring to FIG. 9, FIG. 10), the noise of amplifiers input to the timing generation circuit is $Namp \times \sqrt{(Nch)} (=Namp \times (Nch)^{1/2})$ if the noise level of the single amplifier per se is Namp and the total channel number is Nch. In contrast, according to the aspect of the present invention (e.g., FIG. 1, FIG. 2 of the present Embodiment 1), such noise is $Namp \times \sqrt{(Nch/Nblk)}$ $(=Namp \times (Nch/Nblk)^{1/2})$ if the number of the divided block (i.e., areas 10A, 10B, 10C, 10D segmented by the reflection materials 12) is Nblk. If the signal level is S, the signal level S is invariable in any aspects, so that increase of the S/N ratio can be multiplied by $\sqrt{(Nblk)}(=(Nblk)^{1/2})$ according to the methodology (aspects) of the present invention. Referring to FIG. 1, FIG. 2, according to the aspect of the Embodiment 1, Nch=64, Nblk=4 are given, so that the S/N ratio can increase by $2(=\sqrt{(4)})$ times. In addition, the noise of the semiconductor light receiving elements per se also becomes $1/\sqrt{(Nblk)}(=1/(Nblk)^{1/2})$, so that a silicon multiplier (SiPM) detector, of which noise is particularly big, can ensure a high S/N ratio.

Figure 3:
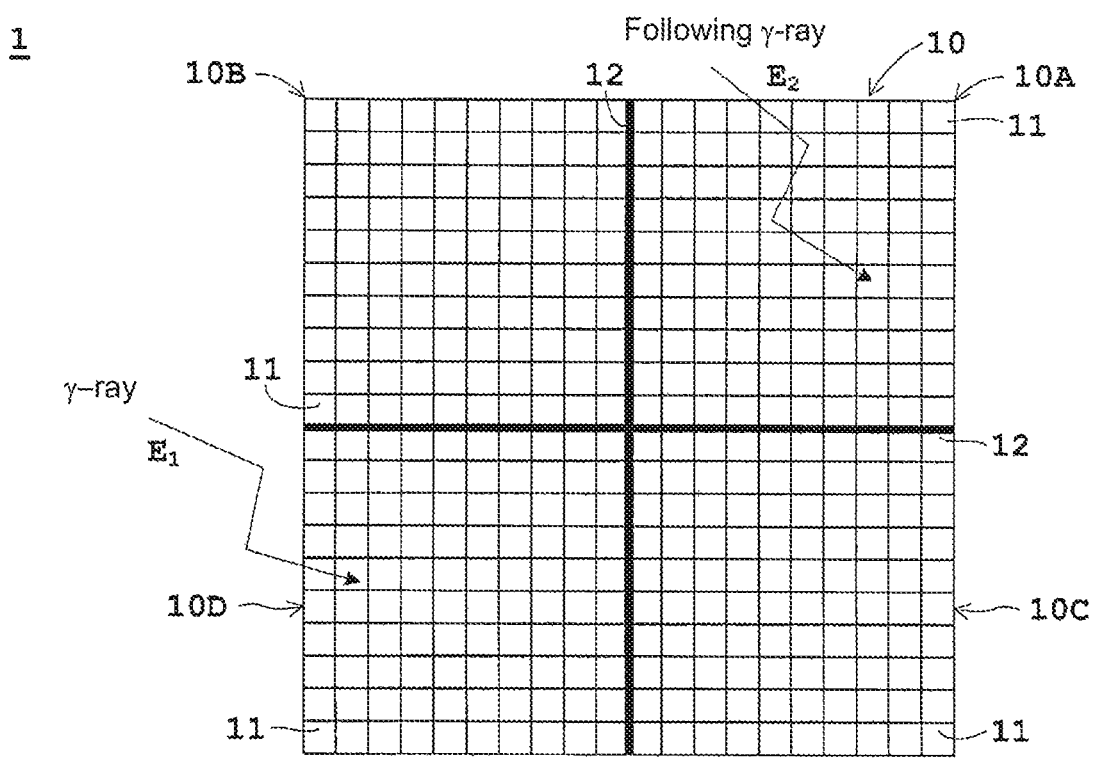
FIG. 3 is a schematic plan view of the radiation detector according to the aspect of the Embodiment 1, 2 illustrating the brief overview of the continuous incidence of γ-rays.

Subsequently, referring to FIG. 3-FIG. 5, the inventor sets forth the case when γ-rays are continuously incident in the different areas (blocks). FIG. 3 is a schematic plan view of the radiation detector according to the aspect of the Embodiment 1, 2 illustrating the brief overview of the continuous incidence of γ-rays, FIG. 4 is a timing chart illustrating the brief overview of generation of the timing signal according to a conventional structure to compare with FIG. 5, and FIG. 5 is a schematic timing chart illustrating the brief overview of generation of the timing signal according to the Embodiment 1.

Referring to FIG. 3, when γ-rays are continuously incident into the different areas, a first radiation event (incident event) is $E_1$ and the following radiation event (incident event) is $E_2$. Referring to FIG. 4, FIG. 5, the timing generation threshold level is Th. In addition, referring to FIG. 4, according to the conventional aspects, a first radiation event signal is $S_{111}$, the following radiation event signal is $S_{112}$, and the ideal timing signal is $T_{110}$, the timing generation signal is S120 and the timing signal is $T_{120}$ (generated based on the timing generation signal $S_{120}$). In addition, referring to FIG. 5, according to the Embodiment 1, a first radiation event signal is $S_{11}$, the following radiation event signal is $S_{12}$, the timing signal of the first event is $T_{11}$, the timing signal of the following event is $T_{12}$ and the final timing signal which is OR logic output is $T_{13}$.

Referring to FIG. 3, the inventor sets forth the case when γ-rays are continuously incident into the different areas (blocks) indicated as $E_1$, $E_2$.

Figure 4:
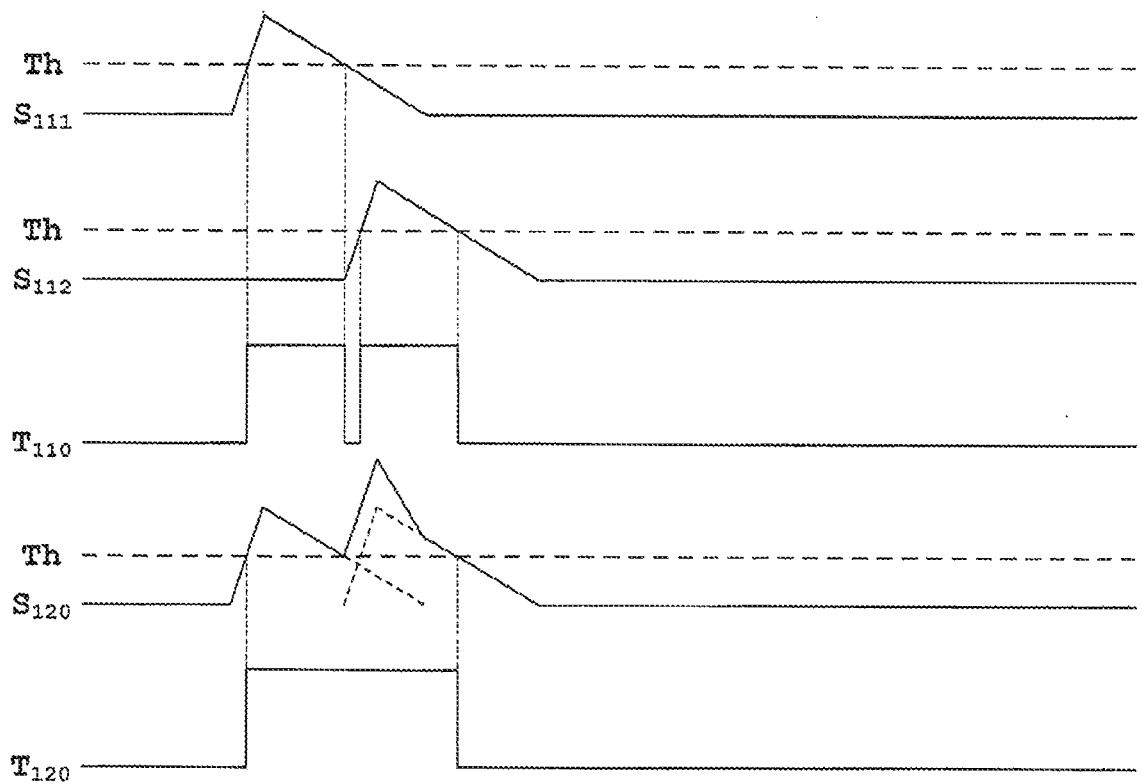
FIG. 4 is a schematic diagram illustrating generation of the timing signal according to a conventional structure to compare with FIG. 5.

Referring to FIG. 4, according to the conventional aspects, when the following radiation event signal $S_{112}$ is generated before the first radiation event signal $S_{111}$ converges, the timing signal relative to the respective events is ideally generated as the ideal timing signal $T_{111}$. Nevertheless, according to the conventional aspects, two signals (the first radiation event signal $S_{111}$ and the following radiation event signal $S_{112}$) are superimposed to generate the timing generation signal $S_{120}$. Consequently, the timing signal of the following event could not be generated or an off-timing signal would be generated.

Particularly, referring to FIG. 4, when the first radiation event signal $S_{111}$ is more than the timing generation threshold level Th and if the following radiation event signal $S_{112}$ is generated, the timing generation signal $S_{120}$ is generated by superimposition as set forth below. Specifically, the timing generation signal $S_{120}$ obtained by superimposition is more than the timing generation threshold level Th while no radiation event is taking place (from when the first radiation event signal $S_{111}$ becomes less than the timing generation threshold level Th on falling to when the following radiation event signal $S_{112}$ becomes more than the timing generation threshold level Th on rising). Consequently, the timing signal T120 is generated while the timing generation signal $S_{120}$ obtained by superimposition is being more than the timing generation threshold level Th.

On the other hand, referring to FIG. 5, according to the aspect of the Embodiment 1, even when the following radiation event signal $S_{12}$ is generated before the first radiation event signal $S_{11}$ converges, generation of the timing signals $T_{11}$, $T_{12}$ per different area (block) is performed, so that the final timing signal $T_{13}$ as the OR logic output can be accurately obtained.

The radiation detector according to the present Embodiment 1 comprises a scintillator array 10 comprising a plurality (400 in each Embodiment) of scintillators 11 and a plurality (64 in each Embodiment) of semiconductor light receiving elements 20, of which the number is smaller than the number of scintillators 11. The semiconductor light receiving elements 20 optically connects at least two scintillators 11 (3 in each Embodiment), so that the semiconductor light receiving elements 20 can have the optical data from at least two scintillators 11 (3 in each Embodiment) in common each other. The scintillator array 10 is segmented per area by the reflection materials 12, so that the scintillator array 10 can be optically divided into a plurality (4 in each Embodiment) of areas (blocks). As well as the conventional aspects, the same number of amplifiers 30, which amplifies signals obtained by the respective semiconductor light receiving elements 20, as the same number of the one-on-one semiconductor light receiving elements 20 are equipped. In contrast, differently from the conventional aspect, the first accumulator 41 that adds multiple (16 in each Embodiment) signals amplified by the amplifiers 30 in the area segmented by the reflection materials 12 is equipped per area segmented by the reflection materials 12 and the first trigger generation circuit 42 that generates a trigger of the signal added by the first accumulator 41 is equipped per area segmented by the reflection materials 12. Consequently, when the signals are added, the superimposition of the inherent noises of each amplifier 30 can be reduced as much as the area segmented by the reflection materials 12, so that the S/N ratio can be increased (by $\sqrt{(Nblk)}(=(Nblk)^{1/2})$ times) and the noise per se can be reduced (to $1/\sqrt{(Nblk)}(=1/(Nblk)^{1/2})$). In addition, even when the following radiation event begins before the current radiation event converges, the signals (timing signals) are respectively and separately generated based on each trigger in the different area to each other and converged in the encoder 50, so that probability of pileups (multiple pileups) can be reduced and the accurate timing signal can be obtained. Consequently, the high S/N ratio is ensured and the accurate timing signal can be obtained.

Embodiment 2

Figure 6:
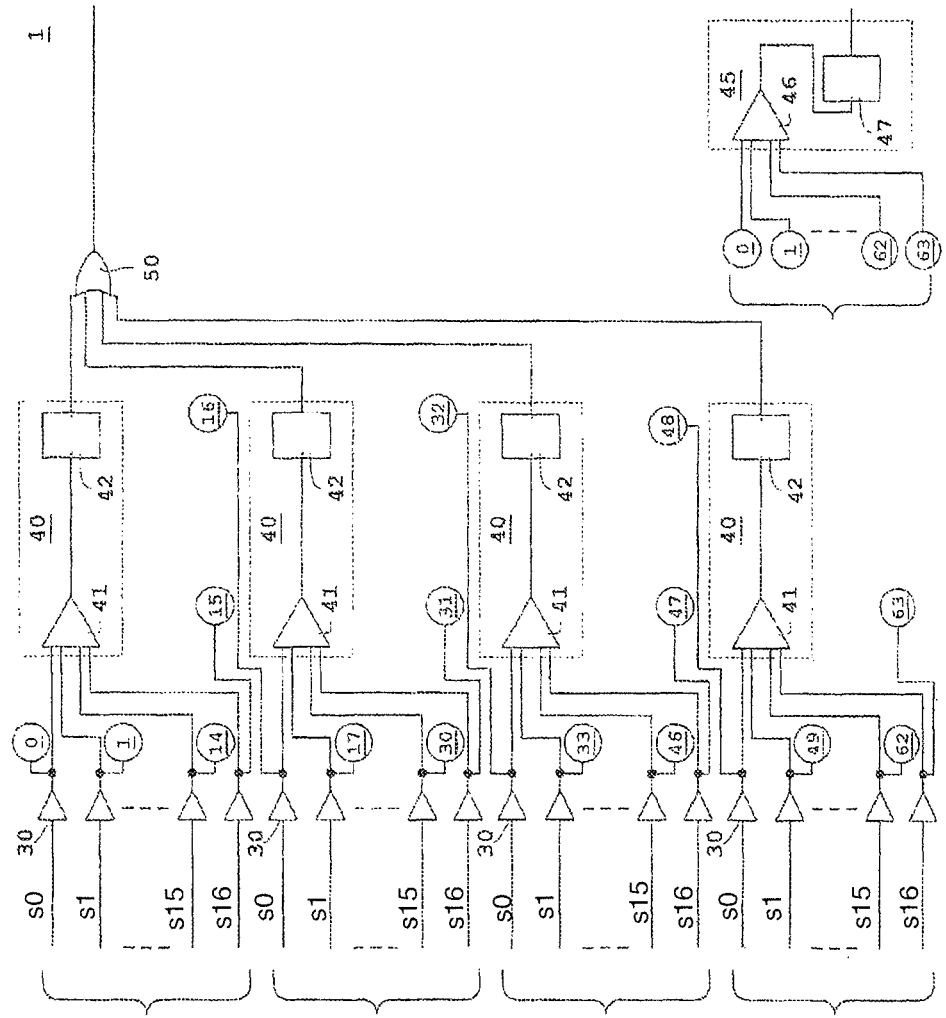
FIG. 6 is a schematic diagram illustrating the amplifiers and the timing generation circuits of the radiation detector according to the Embodiment 2, in which the first accumulator and the second accumulator are in parallel to the amplifiers.
Figure 7:
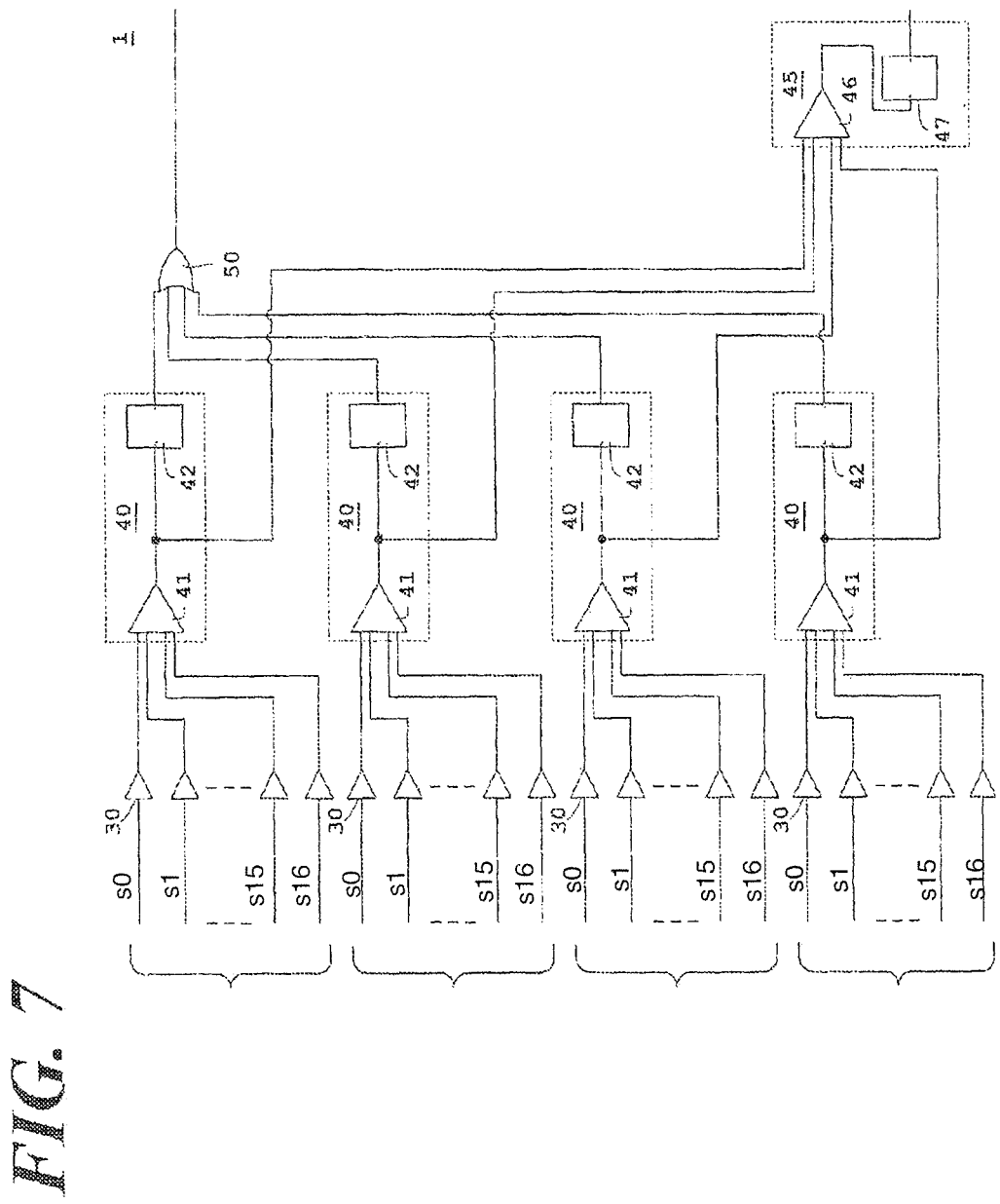
FIG. 7 is a schematic diagram illustrating the amplifiers and the timing generation circuits of the radiation detector according to the Embodiment 2, in which the first accumulator and the second accumulator are in order in series with the amplifiers.
Figure 8:
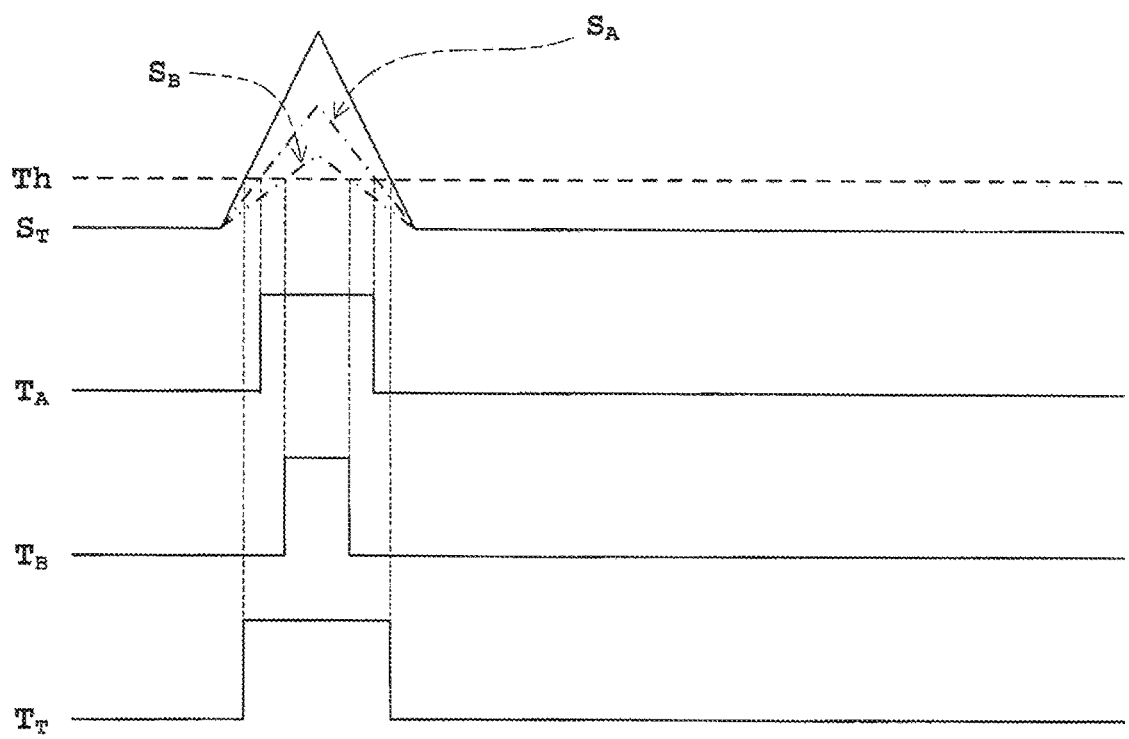
FIG. 8 is a schematic timing chart illustrating generation of the timing signal before addition and after addition according to the Embodiment 2.

Next, referring to FIGs, the inventors set forth the Embodiment 2 of the present invention. FIG. 6 is a schematic diagram illustrating the amplifiers and the timing generation circuit of the radiation detector according to the Embodiment 2, in which the first accumulator and the second accumulator are in parallel to the amplifiers, FIG. 7 is a schematic diagram illustrating the amplifiers and the timing generation circuit of the radiation detector according to the Embodiment 2, in which the first accumulator and the second accumulator are in order in series with the amplifiers, and FIG. 8 is a schematic timing chart illustrating a brief overview of generation of the timing signal before addition and after addition according to the Embodiment 2. The same component as the above Embodiment 1, 2 is indicated by the same sign and the illustration thereof is omitted and is not shown in FIG. In addition, according to the aspect of the Embodiment 2, the aspects of the scintillator array including the reflection materials and the semiconductor light receiving elements are the same as the Embodiment 1 set forth above referring to FIG. 1.

According to the aspect of the present Embodiment 2, referring to FIG. 6 or FIG. 7, the radiation detector comprises a second accumulator 46 that adds all (64 in FIG. 6 or FIG. 7) signals amplified respectively by the amplifiers 30 and a second trigger generation circuit 47 that generates a trigger of the signals added by the second accumulator 46. Referring to FIG. 6 or FIG. 7, the second timing generation circuit 45 is in-place beyond the branch point in the downstream of the amplifiers 30. The second timing generation circuit 45 comprises the second accumulator 46 and the second trigger generation circuit 47.

For example, the signal may decay given radiation transmits the reflection materials due to Compton scattering in the scintillators. In addition, the signal may decay given the light emitted near the reflection materials partially transmits the reflection materials because the reflection materials may not reflect 100% the light emitted from the scintillator depending on the property of the material forming the reflection materials.

The inventor sets forth more specifically referring to FIG. 8 in which the timing generation threshold level is Th as well as in FIG. 4, FIG. 5 set forth above. In addition, it is given that the signal is dispersed into the two areas when radiation or light transmits the reflection materials. One of the timing generation signals dispersed into the two areas is SA and the other timing generation signal SB (in which SA>SB), a timing signal generated based on the timing generation signal SA is TA, and a timing signal generated based on the timing generation signal SB is TB. In addition, the signal obtained by adding all signals (add value of the timing generation signal SA and the timing generation signal SB) is ST, and the timing signal generated based on the timing generation signal ST obtained by adding all signals is TT.

According to the aspect of the Embodiment 1 set forth above, when radiation or light transmits the reflection materials 12 (referring to FIG. 1), both timing generation signal SA added by the first accumulator 41 (referring to FIG. 2) and timing generation signal SB added by the first accumulator 41 are dispersed in two areas. Consequently, the first trigger generation circuit 42 (referring to FIG. 2) generates the timing signal TA based on the trigger of the timing generation signal SA and also the first trigger generation circuit 42 generates the timing signal TB based on the trigger of the timing generation signal SB.

Subsequently, since SA>SB is given, the generation time of the timing signal TA also is longer than the generation time of the timing signal TB and the generation time of the timing signal TA includes the generation time of the timing signal TB. Consequently, even when the encoder 50 (referring to FIG. 2) consisting of the OR logic converges such timing signals TA, TB, the timing signal TA having a longer generation time is output.

As set forth above, such timing generation signals SA, SB have decayed due to dispersion, so that the timing generation signal ST obtained by adding all signals should be normally generated. Accordingly, ST>SA is obtained and if normal, the generated timing signal TT generated based on the timing generation signal ST can be an accurate timing signal. However, the signals converged by the encoder 50 is the timing signal TA and the generation time of the actually obtained timing signal TA becomes shorter than the generation time of the timing generation time ST that should be normally obtained.

However, according to the aspect of the present Embodiment 2, even if the signal decays because radiation or light transmits the reflection materials 12, a trigger of the signal obtained by adding all signals is generated while equipping the second accumulator 46 (referring to FIG. 6 or FIG. 7) and the second trigger generation circuit 47 (referring to FIG. 6 or FIG. 7) set forth above, so that an accurate timing signal TT (timing signal TT in FIG. 8) can be obtained.

According to the aspect of the present Embodiment 2, when the radiation detector comprises the second accumulator 46 and the second trigger generation circuit 47, referring to FIG. 6, the first accumulator 41 and the second accumulator 46 can be connected in parallel to the amplifiers 30 or referring to FIG. 7, the first accumulator 41 and the second accumulator 46 can be connected in order in series with the amplifiers 30. In the latter case (FIG. 7), when the first accumulator 41 and the second accumulator 46 are connected in order in series with the amplifiers, the second accumulator 46 can execute addition by utilizing the signal added by the first accumulator 41.

In addition, referring to FIG. 6, FIG. 7, an output of the signals (timing signals) added by the second trigger generation circuit 47 can be connected to the encoder 50 in FIG. 6 and FIG. 7 even not shown in FIG. In addition, the changeover switch that switches corresponding to a mode (not shown in FIG.) may switch to either signals obtained by the encoder in FIG. 6 and FIG. 7 or signal added by the second trigger generation circuit 47 (timing signal) using the changeover switch. For example, when the signals disperse to the two areas corresponding to the output distribution of the 2-dimensional location map because radiation or light transmits the reflection materials, the mode is switched so that the signals (timing signals) added by the second trigger generation circuit 47 can be output and when other than the above, the mode is switched so that the signals obtained by the encoder 50 can be output.

The present invention is not limited to the aspect of the Embodiment set forth above and further another alternative Embodiment can be implemented set forth below.

(1) According to the aspect of each Embodiment, despite the structure referring to FIG. 1, each Embodiment can be applied to DOI (depth of interaction) detector in which the respective scintillators are layers in the depth direction of γ-rays. Specifically, DOI detector is formed by layering the respective scintillators in the depth direction of γ-rays and coordinate data of the depth direction in which the interaction takes place and the lateral direction (parallel direction to the incident plan) is obtained by the centroid operation. Accordingly, the light source position (depth of interaction) in the depth direction of which the interaction takes place can be discriminated. The reflection materials other than the reflection materials to segment areas are intervened, as needed, to the DOI detector to increase the space resolution.

(2) According to the aspect of each Embodiment 1 as set forth above, no light-guide is included, but the invention can be applied to a detector having the light guide. The light-guide between a scintillator array and a semiconductor light receiving elements is guiding lights and optically connected to the scintillator array and the semiconductor light receiving elements. In addition, as well as the scintillator array, the light guide is segmented per area by the reflection materials.

(3) According to the aspect of each Embodiment 1 as set forth above, as the output terminal of the semiconductor light receiving elements is single, the same number of amplifiers as the number of the semiconductor light receiving elements are included one-on-one, but the invention can be applied to the semiconductor light receiving elements of the array structure having multiple output terminals in one chip. In the case of the semiconductor light receiving elements of the array structure having multiple output terminals in one chip, the same number of amplifiers as the number of the output terminals of semiconductor light receiving elements can be included one-on-one.

REFERENCE OF SIGNS

1 Radiation detector
10 Scintillator array
11 Scintillator
12 Reflection materials
20 Semiconductor light receiving element
30 Amplifier
41 First accumulator
42 First trigger generation circuit
46 Second accumulator
47 Second trigger generation circuit Having described at least one of the preferred embodiments of the present invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents.

What is claimed is:

1. A radiation detector, comprising:
a scintillator array including a plurality of scintillators;
a plurality of semiconductor photo detectors, the semiconductor photo detectors each optically coupled to two or more of the plurality of scintillators;
a plurality of amplifiers for amplifying the output signals of the semiconductor photo detectors;
a reflector that divides the scintillator array into a plurality of regions, each of the regions including a set of the scintillators and a corresponding set of the amplifiers;
each of the regions includes a first accumulator, the accumulator configured to accumulate the amplified signals output from the corresponding set of the amplifiers;
each of the regions includes a first trigger generation circuit, the first trigger generation circuit configured to generate a trigger of a signal from the first accumulator; and
an encoder including an OR logic circuit, the encoder being configured to receive the triggers from the regions to output a single signal.

2. The radiation detector, according to claim 1, further comprising:
a second accumulator configured to add all respective signals amplified by said amplifiers; and
a second trigger generation circuit configured to generate a second trigger of the signals added by said second accumulator.

3. The radiation detector, according to claim 2, wherein:
said first accumulator and said second accumulator are connected in parallel to said amplifiers.

4. The radiation detector, according to claim 2, wherein:
said first accumulator and said second accumulator are connected in series to said amplifiers.

* * * * *